J. W. LAFFERTY & G. B. BROWN.
Drill-Teeth.
No. 220,157.   Patented Sept. 30, 1879.
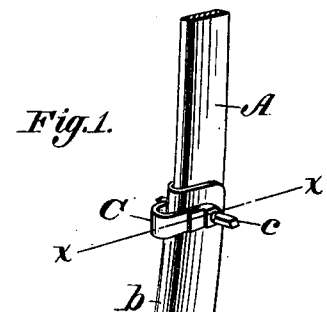
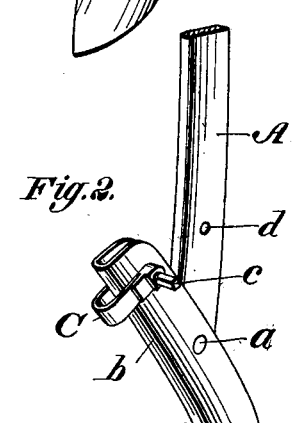
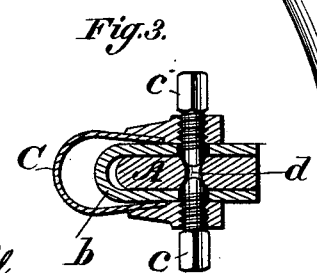
Witnesses:
Donn P. Twitchell.
William W. Dodge.
Inventor:
J. W. Lafferty
G. B. Brown
By Dodge & Son
Attys.

UNITED STATES PATENT OFFICE.

JACOB W. LAFFERTY AND GEORGE B. BROWN, OF MECHANICSBURG, OHIO, ASSIGNORS OF ONE HALF OF THEIR RIGHT TO JOHN C. BAKER, OF SAME PLACE.

IMPROVEMENT IN DRILL-TEETH.

Specification forming part of Letters Patent No. 220,157, dated September 30, 1879; application filed March 19, 1879.

*To all whom it may concern:*

Be it known that we, JACOB W. LAFFERTY and GEORGE B. BROWN, of Mechanicsburg, in the county of Champaign and State of Ohio, have invented certain Improvements in Drill-Teeth, of which the following is a specification.

Our invention relates to a spring-locking device adapted for application to the standards of shovel-plows and drill-teeth already in use; and it consists in a bow-spring provided at or near its ends with inwardly-projecting pins or studs which pass through the shovel-shank and enter recesses or seats in the sides of the standard, as hereinafter explained.

In the accompanying drawings, Figure 1 represents a perspective view of the improved device applied to tooth or standard; Fig. 2, a similar view, showing the shank or shovel released; and Fig. 3, a cross-section on the line $x\ x$ of Fig. 1.

The object of this invention is to provide a simple device which may be readily applied to cultivators, plows, and drills, such as are already in use, for the purpose of holding the shovel in proper position in relation to the standard under ordinary circumstances, and permitting its release when an obstruction is met with, which might otherwise break or injure the shovel or standard, the device being intended for use in connection with shovels or teeth which are pivoted to the standard.

In the drawings, A represents a standard, to which is attached a shovel-shank by means of a transverse pin or pivot, $a$, passing through the shank $b$ and standard A, the shovel being free to swing forward and back upon said pivot except when locked to the standard.

In the drawings we have represented the shank $b$ as bent or folded around the front of the standard and extending backward on each side of the same—a form very common in use; but other forms may be used.

C represents a spring-bow adapted to straddle the shank and beam, and provided with enlarged ends, through which are passed threaded pins or studs $c$, the inner ends of which are rounded or beveled, as shown in Fig. 3.

The pins or studs $c$ pass inward through holes or openings in the sides of the shank $b$, and are arranged to seat themselves in recesses or openings $d$, formed in or through the standard A, as shown.

In practice it is preferred to form simply a continuous hole or opening through the standard, as shown in Fig. 3, the edges or corners being rounded or beveled off to permit the pins or studs $c$ to enter and ride out of them readily.

The spring clasp or bow C is applied above the pivot $a$, as shown, and on the forward side of the shank and standard.

Under the above construction it will be observed that the pins passing through the shank $b$ and into the sockets or recesses $d$, and being held therein by the spring-bow, will lock the shank to the standard with sufficient firmness to prevent the release of the shovel when working in ordinary soil, but permit its release when an unyielding obstruction, such as a root or large stone, is met with.

In order that the point of resistance at which the shovel shall be released may be accurately regulated and readily adjusted, the pins or studs $c$ are threaded, so that they may be turned in the bow C to project more or less deeply into the seats or sockets $d$.

The same result may be secured by providing the shank $b$ with a series of holes, and the standard with a series of seats or recesses, and locating the clasp or bow C nearer to or farther from the pivot $a$. In this latter case the studs or pins $c$ may be made rigidly upon the bow C. The first-described construction is, however, preferred.

By the use of our improved device we are enabled to supply machines already in use with a simple and cheap device by which the yielding point may be perfectly controlled, instead of making them dependent upon wooden pins and similar devices, which vary greatly in their powers of resistance, and also to avoid the necessity of furnishing a new pin each time the shovels are released, it being only necessary when this device is used to swing the shovel back to place.

It will be noticed that under our construction the spring is not required to receive the direct strain and wear, but, owing to the fact that the studs are seated in and held by the shank, the strain is received by the latter and the pins. Consequently the spring may be made lighter, cheaper, and smaller than otherwise, and at the same time the danger of breaking the springs is avoided.

Having thus described our invention, what we claim is—

1. In combination with a standard having a shovel-shank pivoted thereto, a spring-clasp separate and detachable from the shank and standard, provided with studs or projections adapted to engage with the shank and standard and lock them together, substantially as described.

2. In combination with the standard A and pivoted shank $b$, the spring-bow C, adapted to straddle the shank, and provided with projections which pass through the shank and engage with the standard, substantially as described and shown.

3. In combination with the standard and the pivoted shovel-shank, the spring-clasp provided with adjustable studs or pins passing laterally through the shank into the standard.

4. The combination of a standard, a shank or shovel block pivoted thereto, and a locking-pin urged through the shank into the standard by spring-pressure.

JACOB W. LAFFERTY.
GEORGE B. BROWN.

Witnesses:
OSCAR B. HUPP,
T. E. SHEPHERD.